(No Model.)
J. F. GOODRICH.
CONVERTIBLE CARRIAGE.
No. 434,663.   Patented Aug. 19, 1890.
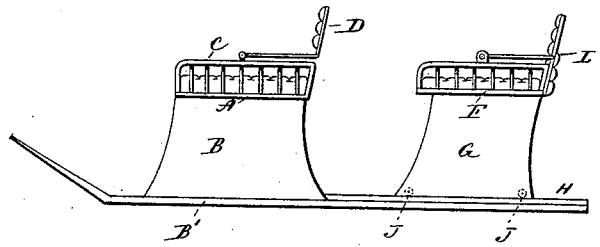
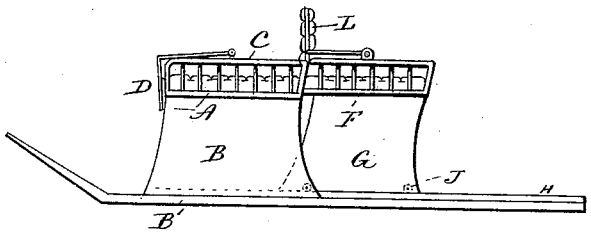
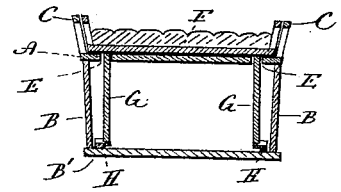
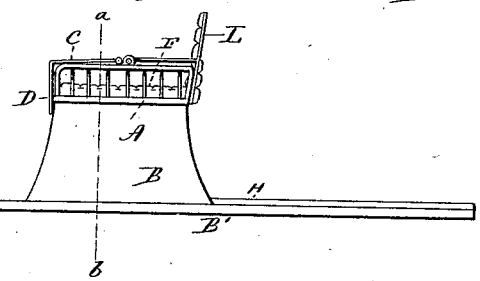
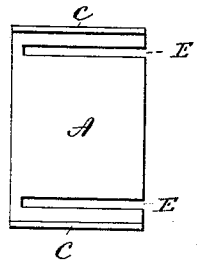
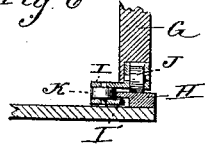
Witnesses
J. N. Shumway
Lillian D. Kelsey
Joseph F. Goodrich
Inventor
By attys
Earle Seymour

UNITED STATES PATENT OFFICE.

JOSEPH F. GOODRICH, OF NEW HAVEN, CONNECTICUT.

CONVERTIBLE CARRIAGE.

SPECIFICATION forming part of Letters Patent No. 434,663, dated August 19, 1890.

Application filed June 20, 1890. Serial No. 356,092. (No model.)

*To all whom it may concern:*

Be it known that I, JOSEPH F. GOODRICH, of New Haven, in the county of New Haven and State of Connecticut, have invented a new Improvement in Convertible Carriages; and I do hereby declare the following, when taken in connection with accompanying drawings, and the letters of reference marked thereon, to be a full, clear, and exact description of the same, and which said drawings constitute part of this sprecification, and represent, in—

Figure 1, a view in side elevation of a carriage embodying my invention and converted for use as a two-seated vehicle; Fig. 2, a similar view showing the sliding seat moved up to the fixed seat to form a dos-a-dos; Fig. 3, a similar view showing the sliding seat moved over the fixed seat to form a one-seated vehicle; Fig. 4, a view of the vehicle in vertical section on the line $a\ b$ of Fig. 3. Fig. 5 is a plan view of the fixed seat, showing the transverse slots entering the same from its rear edge; and Fig. 6 is an enlarged broken view in vertical section, showing the mode of coupling the supports of the sliding seat with the guideways attached to the vehicle-body.

This invention relates to an improvement in convertible carriages, the object being to produce a simple and convenient vehicle of the sliding-seat type adapted to be converted into a one-seated carriage, a two-seated carriage, and a dos-a-dos.

With these ends in view my invention consists in the combination, with a fixed seat, of a sliding seat adapted to be moved up to or over the fixed seat, and in certain details of construction and combinations of parts, as will be hereinafter described, and pointed out in the claims.

The fixed seat A is mounted upon a casing B, rigidly attached to the body B' of the vehicle in any approved manner and provided with side rails C C, with a lazy-back D hinged thereto midway the length thereof, with two parallel slots E E entering it from its rear edge, and with a removable cushion A'.

The sliding seat F, provided with a cushion F', is supported at its ends upon two upright supports G G, respectively arranged at their lower ends to run upon two parallel flanged guideways H H, secured to the vehicle-body and extending forward under the fixed seat. As herein shown, each support is coupled to its guideway by means of a frame I, carrying two anti-friction rollers J and K, respectively arranged to run upon the top and against the edge of the guideway, which enters a horizontal opening I' formed in the frame, which is thus prevented from being lifted away from the guideway. The particular construction of the guideways and the connection between the same and the supports of the sliding seat form, however, no part of my present invention, with which any approved means for supporting and guiding the sliding seat may be employed. The supports of the sliding seat are placed nearer together than the end casings of the fixed seat, and are also higher than the same, so that the sliding seat is not only narrower, but also higher than the fixed seat, whereby it is adapted to slide over the same, at which time its supports enter the slots therein. To compensate for this difference in the height of the seats, the cushion A' of the fixed seat is made higher than the cushion F' of the sliding seat, so that when the latter is moved up to the former for riding dos-a-dos the two seats will have the same elevation. When the sliding seat is moved over the fixed seat, the removable cushion thereof is temporarily taken off. The side rails of the sliding seat are also placed nearer together than the side rails of the fixed seat, so that when the sliding seat is moved over the fixed seat its rails enter between and clear the rails thereof, as shown by Fig. 4 of the drawings, and do not have to be folded down, as has been imperative in prior vehicles of this type. Preferably, and as herein shown, the casing of the fixed seat is made open at the rear; but, if desired, it may be closed thereat and provided with slots corresponding to those in the fixed seat for the supports of the sliding seat to enter when the same is moved forward up to or over the fixed seat.

The sliding seat is provided with a hinged back L, having its entire forward face and the lower half of its rear face cushioned, so that it will offer a cushioned back for the sliding seat when the vehicle is converted into a one or a two seated vehicle, and for both seats when the carriage is transformed into a dos-a-dos, when the lazy-back is turned forward and downward out of the way, as it is also when the carriage is being used as a one-seated vehicle.

I am aware that a sliding seat adapted to slide under a fixed seat after folding its rails inwardly is not new. I do not therefore broadly claim a convertible sliding-seat carriage, but only such a carriage when the sliding seat is made narrower and higher than the forward seat, and is thus adapted to slide over the same.

Having fully described my invention, what I claim as new, and desire to secure by Letters Patent, is—

1. In a convertible sliding-seat carriage, the combination, with a forward seat, of a sliding rear seat made narrower and higher than the forward seat and adapted to move up to the same to form a dos-a-dos, or over the same to form a one-seated vehicle, substantially as described.

2. In a convertible sliding-seat carriage, the combination, with a forward seat having two slots entering it from its rear edge, of a sliding seat narrower and higher than the forward seat and mounted upon two supports adapted to enter the slots in the forward seat, over which the sliding seat is then adapted to be moved, substantially as described.

JOSEPH F. GOODRICH.

Witnesses:
GEO. O. SEYMOUR,
FRED C. EARLE.